A. Krause.
Horse Rake.

N° 61670. Patented Jan 29, 1867

Witnesses.

Inventor:
A. Krause
Per Munn & Co
Attorneys

United States Patent Office.

AMANDES KRAUSE, OF WEST LIBERTY, OHIO.

Letters Patent No. 61,670, dated January 29, 1867.

IMPROVEMENT IN HORSE-RAKES.

The Schedule referred to in these Letters Patent and making part of the same.

TO ALL WHOM IT MAY CONCERN:

Be it known that I, AMANDES KRAUSE, of West Liberty, in the county of Logan, and State of Ohio, have invented a new and improved Horse-Rake; and I do hereby declare that the following is a full, clear, and exact description thereof, reference being had to the accompanying drawings, forming part of this specification.

This invention consists in constructing a horse-rake in such a manner that all the teeth will conform to all the unevenness of the ground, by attaching them to independent bars that are constructed in such a manner that each one can be raised up and down without interfering with the other. It is also constructed in such a manner that by means of a rock-shaft and lever connected thereto, all of the teeth may be acted upon at once, and either raised or depressed as circumstances may require, and at the same time.

To enable others skilled in the art to make and use my invention, I will proceed to describe its construction and operation.

Letters of like name and kind refer to like parts in each of the figures.

Figure 1:
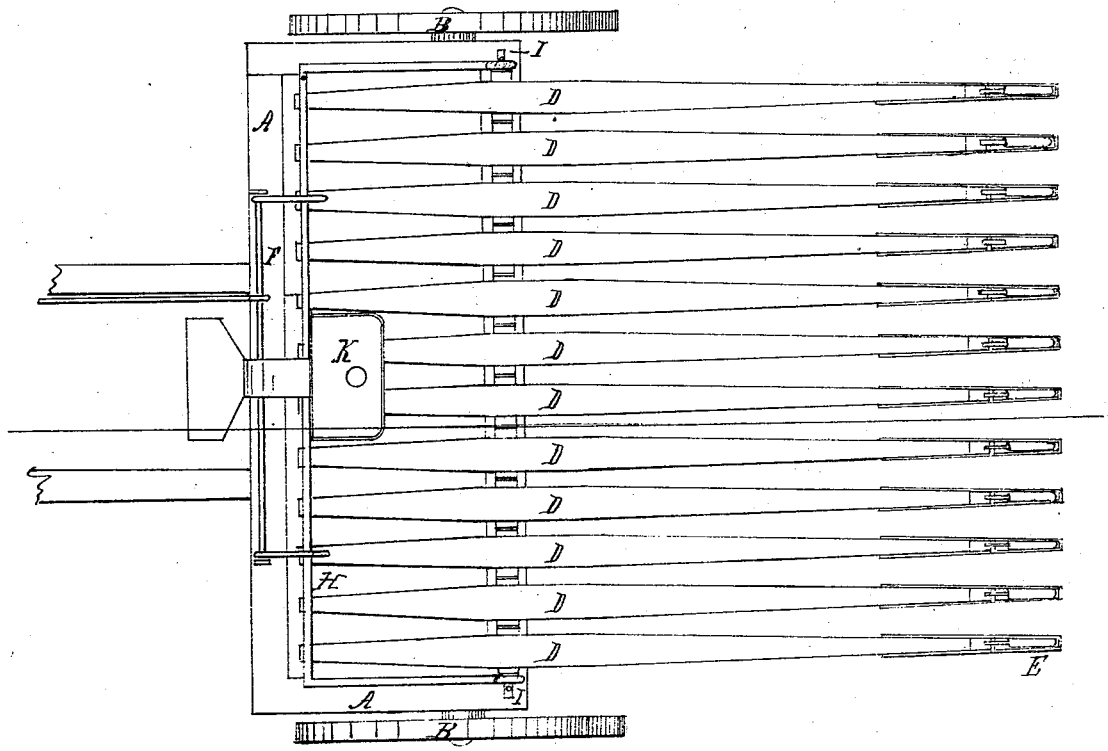
Figure 1 is a top plan view of my improved horse-rake.
Figure 2:
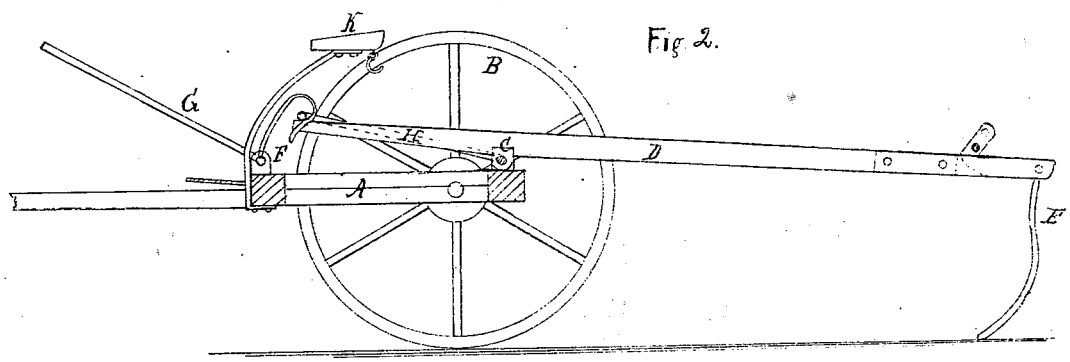
Figure 2 is a longitudinal vertical sectional elevation of the same, taken from the line X X.

A represents a rectangular frame made of wood, of any suitable dimensions, at the end of which are journals secured to the said frame A, on which are the wheels B B. Upon the top and at the rear end of the frame A are a series of eyes that project up, to which are fitted corresponding staples, C, which are attached to the eyes by means of a long bolt passing through the said eyes and holes in the staples, thus forming a joint. To these staples are attached the rake-bars D, which extend back and receive the teeth E at the rear end. At the forward end of the frame A is a rock-shaft, F, provided with a lever, G. Upon this rock-shaft F is also another hook lever that engages another lever, H, that works about the long bolt I. The teeth of my improved rake are made of steel, the upper ends of which turn at right angles, and are hinged to a slot in the bars D in the said angle, the end of the tooth running forward in the slot at the rear end of the bar, and is turned up a short distance where there are a series of holes, in which are inserted a wooden pin, which forms a bearing upon the upper side of the bar D. The object of these holes is that the pin can be changed and the tooth set at any desired angle to the work. These wooden pins are preferred to iron for the reason that if the tooth meets an obstruction and is held, the wooden pin will break, and the tooth will turn back and pass over the obstacle without breaking or otherwise injuring the tooth. J J are the shafts, the rear ends of which are secured to the frame A, and extend forward in the ordinary manner, and in which the horse is placed to draw the machine. K is the driver's seat, attached to a spring which is secured to the front of the frame and extends up and back on a curve to a proper position, so as to make the driver comfortable in his position.

The operation of my improved rake is rapid and perfect, and simply consists in attaching the horse to the rake, and as the machine is moved across the field the hay accumulates in front of the teeth until they are full, when the driver draws back the lever G, the lever H is pressed down upon the front end of the bars D, and being pivoted at C, the rear ends containing the teeth are raised up, and the hay that has accumulated in front of them is discharged, and the lever G again thrown forward and the teeth again allowed to come in contact with the ground.

This rake, by its simplicity of construction and operation, and not being liable to get out of order, makes one of the most economical and desirable horse-rakes now used.

Having thus described my invention, what I claim as new, and desire to secure by Letters Patent of the United States, is—

1. The bent lever G with its hooked end, and the lever H, in combination with the rake-bars D, operating substantially as described, for the purpose specified.

2. I claim the independent bars D, and teeth E, in combination with the rock-shaft F, the lever H, and frame A, for the purposes and substantially as described.

AMANDES KRAUSE.

Witnesses:
A. H. COOPER,
ROBERT N. JORDAN.